(12) United States Patent
Thomas et al.

(10) Patent No.: US 11,599,878 B2
(45) Date of Patent: Mar. 7, 2023

(54) SYSTEMS AND METHODS FOR IDENTIFYING ERRORS IN TRANSACTION MESSAGES

(71) Applicant: Mastercard International Incorporated, Purchase, NY (US)

(72) Inventors: Jason A. Thomas, Fenton, MO (US); Kyle T. Williams, Wentzville, MO (US); David J. Senci, Troy, IL (US)

(73) Assignee: Mastercard International Incorporated, Purchase, NY (US)

( * ) Notice: Subject to any disclaimer, the term of this patent is extended or adjusted under 35 U.S.C. 154(b) by 391 days.

(21) Appl. No.: 16/226,285

(22) Filed: Dec. 19, 2018

(65) Prior Publication Data
US 2020/0202342 A1 Jun. 25, 2020

(51) Int. Cl.
*G06Q 20/38* (2012.01)
*G06F 11/07* (2006.01)

(52) U.S. Cl.
CPC ....... *G06Q 20/388* (2013.01); *G06F 11/0769* (2013.01); *G06F 11/0772* (2013.01); *G06Q 20/3821* (2013.01)

(58) Field of Classification Search
CPC .... G06Q 20/102; G06Q 30/06; G06Q 10/107; G06Q 20/403; G06Q 50/10; G06Q 20/382; G06Q 20/3224; G06Q 20/384; G06Q 20/4016; G06Q 20/401; G06Q 20/388; G06Q 20/3821; G06Q 20/02; G06Q 20/20; G06F 11/0769; G06F 11/0772; G06F 11/0763
See application file for complete search history.

(56) References Cited

U.S. PATENT DOCUMENTS

| | | | |
|---|---|---|---|
| 2002/0174062 A1* | 11/2002 | Sines | G06Q 20/02 705/40 |
| 2004/0030615 A1* | 2/2004 | Ling | G06Q 30/0277 705/14.73 |
| 2006/0010070 A1* | 1/2006 | Banaugh | G06Q 30/06 705/40 |

(Continued)

*Primary Examiner* — Jacob C. Coppola
*Assistant Examiner* — Terry Nathan Murray
(74) *Attorney, Agent, or Firm* — Hovey Williams LLP

(57) ABSTRACT

A computer-implemented method for identifying errors in transaction messages associated with payment transactions. The method includes a step of receiving a transaction message associated with a financial transaction, whereby the financial transaction originates from a merchant and is processed by an acquirer. The transaction message comprises a plurality of data element fields, with at least one of the data element fields being a merchant identification field used to identify the merchant originating the financial transaction. An additional step includes performing an error-identification routine on the transaction message, with the error-identification routine including analyzing a merchant identification (ID) data element populated in the merchant identification field to determine if the merchant ID data element is not uniquely associated with the merchant. An additional step includes generating an error message indicating that the merchant ID data element is not uniquely associated with the merchant, and transmitting the error message to the acquirer.

20 Claims, 6 Drawing Sheets

(56) References Cited

U.S. PATENT DOCUMENTS

| | | | |
|---|---|---|---|
| 2006/0031289 A1* | 2/2006 | Experton | G06F 21/6245 709/204 |
| 2006/0180660 A1* | 8/2006 | Gray | G07F 7/10 455/414.1 |
| 2007/0277224 A1* | 11/2007 | Osborn | G06F 21/36 726/2 |
| 2009/0228365 A1* | 9/2009 | Tomchek | G06Q 20/10 707/E17.014 |
| 2012/0310760 A1* | 12/2012 | Phillips | G06Q 20/3278 705/26.1 |
| 2013/0073859 A1* | 3/2013 | Carlson | H04L 9/3247 713/176 |
| 2013/0097078 A1* | 4/2013 | Wong | G06Q 20/10 705/44 |
| 2014/0279507 A1* | 9/2014 | Whitler | G06Q 20/4016 705/44 |
| 2016/0132857 A1* | 5/2016 | Unser | G06Q 20/12 705/39 |

* cited by examiner

SYSTEMS AND METHODS FOR IDENTIFYING ERRORS IN TRANSACTION MESSAGES

FIELD OF THE DISCLOSURE

The field of the disclosure relates generally to systems and methods for identifying errors associated with transaction messages and, more particularly, to network-based systems and methods for analyzing merchant and acquirer fields in transaction messages associated with payment transactions to identify and resolve errors based on the analyses.

BACKGROUND OF THE DISCLOSURE

The use of credit and/or debit cards for payment transactions is now commonplace. To process payment transactions, merchants will generally have their own, integral payment processing systems, which are integrated with the merchants' acquiring institution. However, the use of third-party payment facilitators is becoming more prevalent with many merchants. For instance, in addition to a merchant's own payment processing systems (as provided by its acquiring institution), a merchant can also allow payment transactions to be processed by one or more third-party payment service providers (PSPs), such as PayPal™, Square™, PayU™, and iZettle™. Unfortunately, the use of PSPs by merchants can lead to various problems, such as problems related to network reporting, fraud monitoring, data integrity, the monitoring of network-based programs, and the like.

For example, payment transactions processed through a merchant's own payment processing system will generally be processed via transaction messages that include a unique identifier that corresponds with the merchant and/or the merchant's acquiring institution. In addition, however, if the merchant uses a PSP to process payment transactions, such payment transactions will be processed via transaction messages that include their own unique identifier that corresponds with both the PSP and/or the PSP's acquiring institution. Unfortunately, PSPs will often use the same unique identifier regardless of where the PSP is operating. For instance, a PSP may use the same unique identifier when processing transactions at both a first merchant (e.g., a brick-and-mortar store at a first geographic location) and a second merchant (e.g., a brick-and-mortar store at a second geographic location). Such duplicate usage of the unique identifier can cause problems with network reporting, fraud monitoring, data integrity, the monitoring of network-based programs, and the like. For instance, some payment networks offer programs that monitor a merchant's transactions. An exemplary program is an excessive chargeback program that monitors a merchant's transactions to ensure that the transactions stay within a normal chargeback to sales ratio. If a PSP improperly duplicates a unique identifier across multiple merchants, network monitoring and reporting will be affected, as the payment network will be unable to accurately determine a given merchant's actual chargeback to sales ratio.

BRIEF DESCRIPTION OF THE DISCLOSURE

This summary is not intended to identify essential features of the present invention, and is not intended to be used to limit the scope of the claims. These and other aspects of the present invention are described below in greater detail.

In one aspect, embodiments of a system are provided for identifying errors in transaction messages processed through a payment network. The system comprises a memory device for storing data, and a processor communicatively coupled to the memory device and programmed to perform a number of steps. One step includes receiving from a sender a transaction message associated with a financial transaction, with the financial transaction originating from a merchant and being processed through an acquirer. The transaction message comprises a plurality of data element fields, with at least one of the data element fields being a merchant identification field used to identify the merchant at which the financial transaction originated. An additional step includes performing an error-identification routine on the transaction message, with the error-identification routine including analyzing a merchant identification (ID) data element populated in the merchant identification field to determine if the merchant ID data element is not uniquely associated with the merchant. An additional step includes generating an error message indicating that the merchant ID data element is not uniquely associated with the merchant. A further step includes transmitting the error message to the acquirer.

In another aspect, embodiments of a computer-implemented method are provided for identifying errors in transaction messages processed through a payment network. One step of the method includes receiving from a sender a transaction message associated with a financial transaction, with the financial transaction originating from a merchant and being processed through an acquirer. The transaction message comprises a plurality of data element fields, with at least one of the data element fields being a merchant identification field used to identify the merchant at which the financial transaction originated. An additional step includes performing an error-identification routine on the transaction message, with the error-identification routine including analyzing a merchant identification (ID) data element populated in the merchant identification field to determine if the merchant ID data element is not uniquely associated with the merchant. An additional step includes generating an error message indicating that the merchant ID data element is not uniquely associated with the merchant. A further step includes transmitting the error message to the acquirer.

In yet another aspect, embodiments provide for one or more non-transitory computer-readable storage media having computer-executable instructions for identifying errors in transaction messages processed through a payment network. When executed by at least one processor the computer-executable instructions cause the processor to perform a number of steps. One step includes receiving from a sender a transaction message associated with a financial transaction, with the financial transaction originating from a merchant and being processed through an acquirer. The transaction message comprises a plurality of data element fields, with at least one of the data element fields being a merchant identification field used to identify the merchant at which the financial transaction originated. An additional step includes performing an error-identification routine on the transaction message, with the error-identification routine including analyzing a merchant identification (ID) data element populated in the merchant identification field to determine if the merchant ID data element is not uniquely associated with the merchant. An additional step includes generating an error message indicating that the merchant ID data element is not uniquely associated with the merchant. A further step includes transmitting the error message to the acquirer.

BRIEF DESCRIPTION OF THE DRAWINGS

Embodiments of the present invention are described in detail below with reference to the attached drawing figures, wherein.

The figures are not intended to limit the present invention to the specific embodiments they depict. The drawings are not necessarily to scale. Like numbers in the Figures indicate the same or functionally similar components.

DETAILED DESCRIPTION OF THE DISCLOSURE

Figure 1:
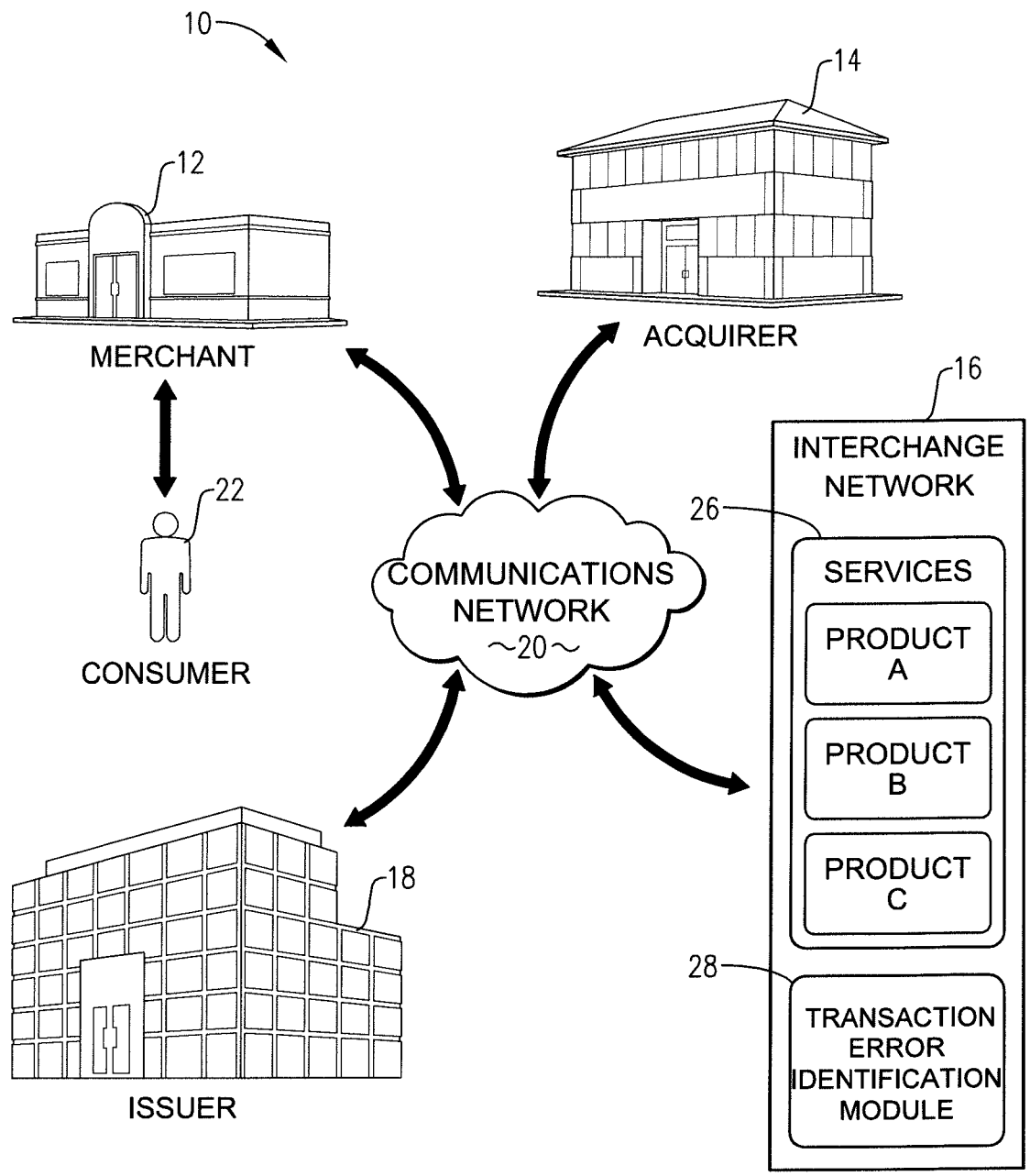
FIG. 1 is a block diagram of an exemplary multi-party payment network system having a transaction error identification module (TEI module) according to embodiments of the present invention.

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. It is contemplated that the invention has general application to identifying errors in transaction messages associated with payment transactions made using payment network systems. However, the scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, operation, etc. described in one embodiment may also be included in other embodiments, but is not necessarily included. Thus, particular implementations of the present invention can include a variety of combinations and/or integrations of the embodiments described herein.

Broadly characterized, the present invention relates to systems and methods for identifying and resolving errors in transaction messages associated with payment transactions. More particularly, the disclosed embodiments provide systems and computer-implemented methods for identifying errors in transaction messages used in network-based payment transactions. In one exemplary embodiment, a transaction error identification module (TEI module) for identifying and resolving errors within transaction messages associated with payment transactions may be configured for use with a payment-card processing network such as, for example, an interchange network. The TEI module may comprise a memory device and a processing element in communication with the memory device. As such, the TEI module is configured to work in association with and/or to communicate with the interchange network for purposes of receiving and analyzing transaction messages generated in association with payment transactions. The TEI module may be configured to analyze specific fields within transaction messages, and based on such analyses, determine whether the transaction messages include errors, such as improperly duplicating identification elements within the transaction messages. For those transaction messages that are determined to include errors, the interchange network (e.g., via the TEI module) may resolve such errors so as to prevent or otherwise minimize errors being associated with transaction messages of future payment transactions.

Turning now to a system for implementing embodiments of the present invention, FIG. 1 is a block diagram of an exemplary multi-party payment network system 10. In general, the payment network system 10 is configured to enable payment transactions, such as payment-by-card transactions, through operation of a number of interconnected parties, including merchants 12, acquirers 14, interchange networks 16, and/or card issuers 18. Embodiments described herein may relate to a payment network system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. Mastercard is a registered trademark of Mastercard International Incorporated located in Purchase, N.Y.

As used herein, financial transaction data may include transaction messages, which are unique data messages that include information related to payment transactions initiated via payment cards (e.g., credit or debit cards). In some embodiments, as will be described in more detail below, transaction messages may be formatted according to one or more commonly-used standards, such as the ISO 8583 standard format. Broadly, a transaction message may include data fields populated with various types of information or data (e.g., data elements) related to a payment transaction made with a payment card. For example, such data may include (1) an account or card number associated with the payment card, and (2) purchase data representative of the payment transaction, e.g., a type of merchant, a merchant identification (ID), an acquirer identification (ID), a dollar amount of the purchase, date of purchase, and the like. As will be described in more detail below, the transaction messages for a given payment transaction may be transmitted between the various parties of the payment network system 10 for purposes of validating the payment transaction and settling funds related to the payment transaction.

As noted above, in the exemplary embodiment of FIG. 1, the payment network system 10 may generally include the merchant 12, the acquirer 14, the interchange network 16, and the issuer 18, coupled in communication via a communications network 20. As such, a cardholder 22 (e.g., a consumer), who is an authorized user of a payment card, can initiate a payment transaction over the payment network system 10 to make a purchase from a merchant 12. The communications network 20 used to interconnect the parties of the payment network system 10 may include various types of networks, such as one or more of a local area network (LAN), a wide area network (WAN) (e.g., the Internet, etc.), a mobile network, a virtual network, and/or any other suitable public and/or private network capable of facilitating communication among the merchant 12, the acquirer 14, the interchange network 16, and/or the issuer 18. In some embodiments, the communications network 20 may include more than one type of network, such as a private payment transaction network provided by the interchange network 16 to the acquirers 14 and the issuers 18 and, separately, the public Internet, which may facilitate communication between the merchants 12 and (1) the interchange network 16, (2) the acquirers 14, and/or (3) the cardholder 22.

The payment network system 10 may facilitate payment transactions made by the cardholder 22. In typical systems, a financial institution, referred to as an "issuing bank," an "issuing institution," or the issuer 18, issues a payment card, such as a credit or debit card, to a cardholder 22, who uses the payment card to tender payment for purchases made from a merchant 12. Merchants 12 are typically associated with products, for example, and without limitation, goods and/or services, that are offered for sale and are sold to the cardholder 22. The merchant 12 may include, for example, a physical location and/or a virtual location. A physical location includes, for example, a brick-and-mortar store, etc., and a virtual location includes, for example, an Internet-based store-front.

To accept payment with the payment card, the merchant 12 generally has established an account with a financial institution that is part of the payment network system 10. This financial institution is generally referred to as a "merchant bank," an "acquiring bank," an "acquiring institution," or the acquirer 14. When the cardholder 22 tenders payment for a purchase with a payment card, the merchant 12 requests authorization from the acquirer 14 for the amount of the purchase. The request may be performed over the telephone, but is usually performed through the use of a computing device, such as point-of-sale (POS) terminal, that reads the cardholder's 22 account information from a magnetic stripe, a chip, or embossed characters on the payment card and generates a transaction message, in the form of an authorization request, which is communicated electronically to transaction processing computers of the acquirer 14. Alternatively, the acquirer 14 may authorize a third party to perform transaction processing on its behalf. In such cases, the merchant's 12 point-of-sale terminal will be configured to communicate with the third party. Such a third party is generally referred to as a "merchant processor," an "acquiring processor," or a "third-party processor." In addition to a merchant's 12 own payment processing systems (as provided by its acquirer 14) or third-party processor, certain merchants 12 may also provide for payment transactions originating at the merchant 12 to be processed by one or more third-party payment service providers (PSPs), such as PayPal™, Square™ PayU™, and iZettle™. In general, and importantly, such PSPs are commonly associated with their own respective acquirers 14, which may be different from the acquirers 14 of the merchants 12 at which the PSPs are located.

Using the interchange network 16, computing devices of the acquirer 14 can communicate with computing devices of the issuer 18 to determine whether the cardholder's 22 account is in good standing and whether the purchase is covered by the cardholder's 22 available credit line or account balance. Again, such communication generally involves the interchange network 16 providing the transaction message from the acquirer 14 to the issuer 18, such that the issuer 18 can verify that the cardholder's 22 account has sufficient funds to cover the payment transaction. Based on these determinations, the payment transaction can be declined or accepted. Specifically, the issuer 18 can generate a transaction message, in the form of an authorization response, which indicates whether the payment transaction should be declined or accepted. The transaction message can be sent from the issuer 18, via the interchange network 16 and/or the acquirer 14, to the merchant 12 such that the cardholder 22 can be informed as to whether the payment transaction is declined or accepted.

When a request for authorization of the payment transaction is accepted, the available credit line or account balance of the cardholder's 22 account is decreased. Normally, a charge for an online payment card transaction is not posted immediately to the cardholder's 22 account because bankcard associations, such as Mastercard International Incorporated, have promulgated rules that do not allow the merchant 12 to charge, or "capture," a payment transaction until the purchased goods are shipped or the purchased services are delivered. However, with respect to at least some debit card transactions, a charge may be posted at the time of the payment transaction. When the merchant 12 ships or delivers the goods or services, the merchant 12 captures the payment transaction by, for example, appropriate data entry procedures on the point-of-sale terminal. This may include bundling of approved transactions daily for standard retail purchases. If the cardholder 22 cancels a payment transaction before it is captured, a "void" is generated. If the cardholder 22 returns goods after the transaction has been captured, a "credit" is generated. For debit card transactions, when a request for a personal identification number (PIN) authorization is requested and is approved by the issuer 18, the cardholder's 22 account is decreased. Normally, a charge is posted immediately to the cardholder's account. The interchange network 16 transmits the approval to the acquirer 14 for distribution of goods/services or information, or cash in the case of an automated teller machine (ATM).

After a purchase has been made, a clearing process occurs to transfer additional financial transaction data related to the purchase transaction among the parties of the payment network system 10, such as the acquirer 14, the interchange network 16, and the issuer 18. More specifically, during and/or after the clearing process, additional financial transaction data, such as a time of purchase, a merchant name, a type of merchant, purchase information, cardholder account information, a type of transaction, itinerary information, information regarding the purchased item and/or service, and/or other suitable information, may be associated with the payment transaction and transmitted between parties to the payment transaction, and may be stored (e.g., in databases) by any of the parties.

After a payment transaction is authorized and cleared, the payment transaction is settled among the merchant 12, the acquirer 14, and the issuer 18. Settlement refers to the transfer of financial transaction data and/or funds among the merchant's 12 account, the acquirer 14, and the issuer 18 related to the transaction. Usually, payment transactions are captured and accumulated into a batch, which is settled as a group. More specifically, a payment transaction is typically settled between the issuer 18 and the interchange network 16, and then between the interchange network 16 and the acquirer 14, and then between the acquirer 14 and the merchant 12. With respect to the settlement communications between the interchange network 16 and the acquirer 14, such communication is often performed once per day, as "settlement batch message," which includes settlement information for all payment transactions for the day that were processed by the interchange network 16 for the acquirer 14.

With continued reference to FIG. 1, the interchange network 16 is generally used to facilitate communication and financial transaction data processing between the parties of the payment network system 10. In addition, however, the interchange network 16 may be configured to offer or provide one or more services 26 (e.g., Product A, Product B, Product C, etc.) to one or more of its clients, which may include the merchants 12, the acquirer 14, the issuer 18, and/or the cardholder 22. The services may be referred to as value-added services 26, for example, in that the services are often provided in addition to the standard interchange network 16 goal of coordinating payment transactions initiated by the cardholders 22. Exemplary services include, for example and without limitation, fraud services (e.g., fraud detection, fraud scoring, etc.), loyalty services (e.g., managing reward points, etc.), account control services (e.g., transaction limits, etc.), authentication services, routing intelligence services, message transformation services (e.g., format and/or standard conversions, etc.), services for applying additional derived data, analyzing, and/or insights to transaction messages, identification of other value added services to be applied, and the like.

Embodiments of the present invention provide for the interchange network 16 to be configured to offer or provide a specific value-added service 26, in the form of an error-identification service, which can be used to identify and resolve errors in transaction messages associated with payment transactions. This error-identification service may be implemented by a transaction error identification (TEI;) module 28, which is illustrated schematically as part of the interchange network 16 of FIG. 1. The TEI module 28 may be configured as a specially-programmed computer system that enables the interchange network 16 to implement an automated process or routine to analyze transaction messages (e.g., authorization messages or response messages) resulting from payment transactions initiated by a cardholder 22. Based on the TEI module's 28 analyses of transaction messages, errors included in the transaction messages can be identified and preventative actions can be undertaken to prevent or minimize future errors. As will be described in more detail below, the TEI module 28 may comprise a computing device in the form of one or more processing elements communicatively coupled with one or memory elements with a computer program stored thereon (e.g., a computer-readable storage media or medium comprising a non-transitory medium with an executable computer program stored thereon), such that the TEI module 28 can be specially programmed to (1) receive transaction messages associated with payment transactions, (2) analyze one or more fields included within the transaction messages, (3) identify errors within the transactions messages, and (4) notify acquirers 14 of such identified errors so as to prevent or minimize errors in transaction messages of future payment transactions.

Figure 2:
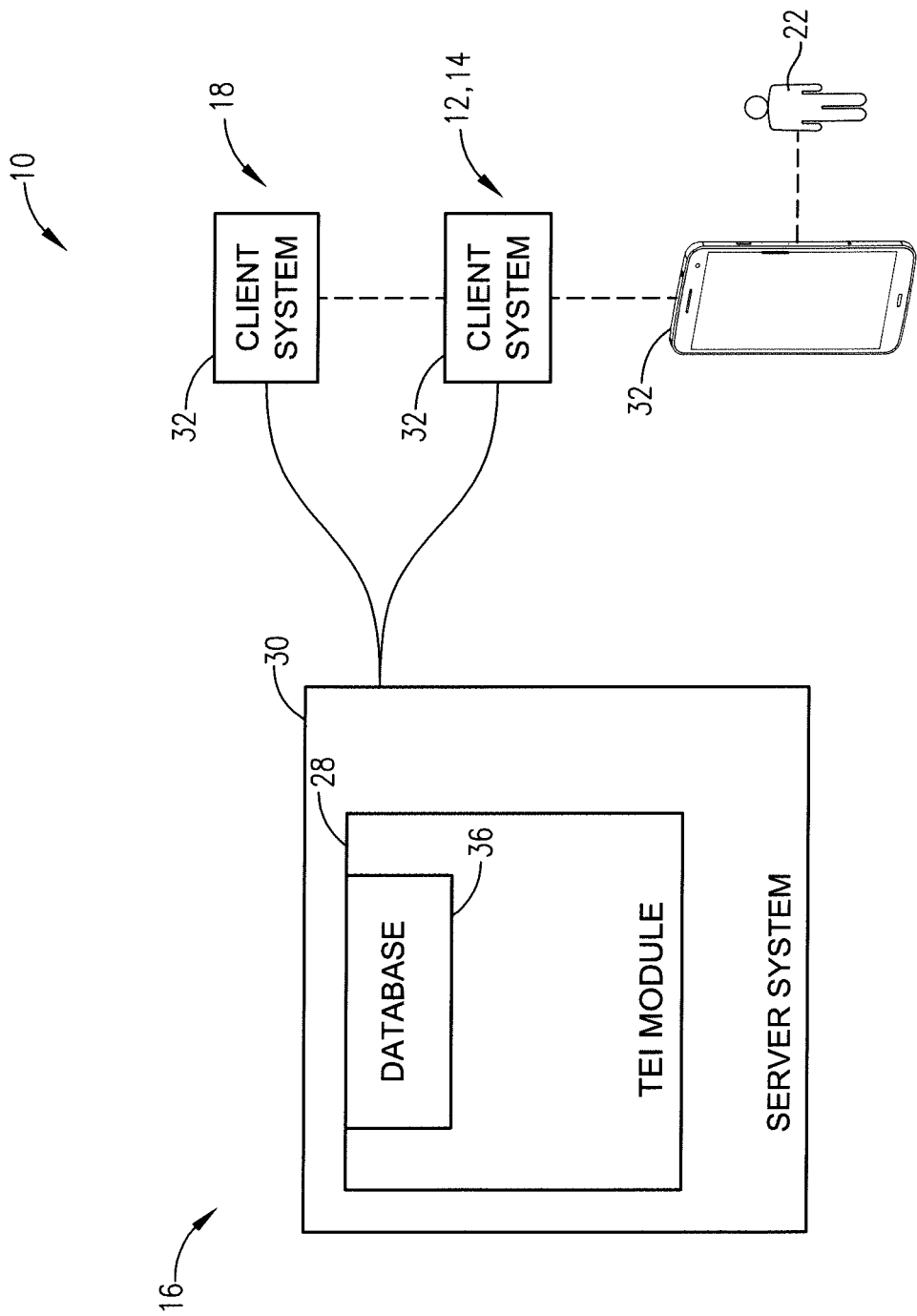
FIG. 2 is another block diagram of an exemplary payment card network system, such as the payment card network system shown in FIG. 1, including a plurality of client computing systems connected to a server system of an interchange network, and with the TEI module from FIG. 1 illustrated in association with the server system.

FIG. 2 is another simplified block diagram of the exemplary payment network system 10. The block diagram of FIG. 2 may be considered an alternate description of the components of the payment network system 10 described above. The payment network system 10 of FIG. 2 includes a plurality of computing devices such as, for example, the TEI module 28, a server system 30, and one or more client systems 32 all connected via a communications network, such as the Internet. The server system 30 may comprise a server-type computing device of the interchange network 16, which is particularly configured to perform various functions and features described herein on behalf of the interchange network 16. Similarly, the TEI module 28 may comprise a computing device of the interchange network 16, which is particularly configured to validate payment transactions initiated at a merchant 12. In some embodiments, the TEI module 28 may be incorporated within the server system 30. In alternate embodiments, the TEI module 28 may be separate from the server system 30. In contrast, the client systems 32 may be computing devices of clients, such as the merchant 12, the acquirer 14, the issuer 18, and/or the cardholder 22, which are in communication with the server system 30 via the communications network. It is noted that the payment network system 10 may include more, fewer, or alternative components and/or perform more, fewer, or alternative actions, including those discussed elsewhere herein.

In more detail, the server system 30 may be associated with the interchange network 16, and may be referred to as an interchange computer system. Broadly, the server system 30 may be used for processing financial transaction data, including transaction messages, associated with payment transactions. In some embodiments, the server system 30 may include, or otherwise be associated with a database 36, which is configured to store information about a variety of matters, such as may be necessary for processing financial transaction data. In some embodiments, the database 36 may comprise a centralized database stored on the server system 30. In some embodiments, the database 36 may be associated with the TEI module 28. In an alternative embodiment, the database 36 may be stored remotely from the server system 30 and/or the TEI module 28, such as in the form of a distributed or non-centralized database. In one exemplary embodiment, the database 36 may include a single database having separated sections or partitions or may comprise multiple, individual databases (as described below). In some embodiments, for example, where the database 36 includes separate sections, partitions, or multiple databases, the database 36 may be configured to store financial transaction data generated as part of payment transactions conducted over the payment network system 10 including data relating to cardholders 22, issuers 18, acquirers 14, and/or payment transactions.

Figure 3:
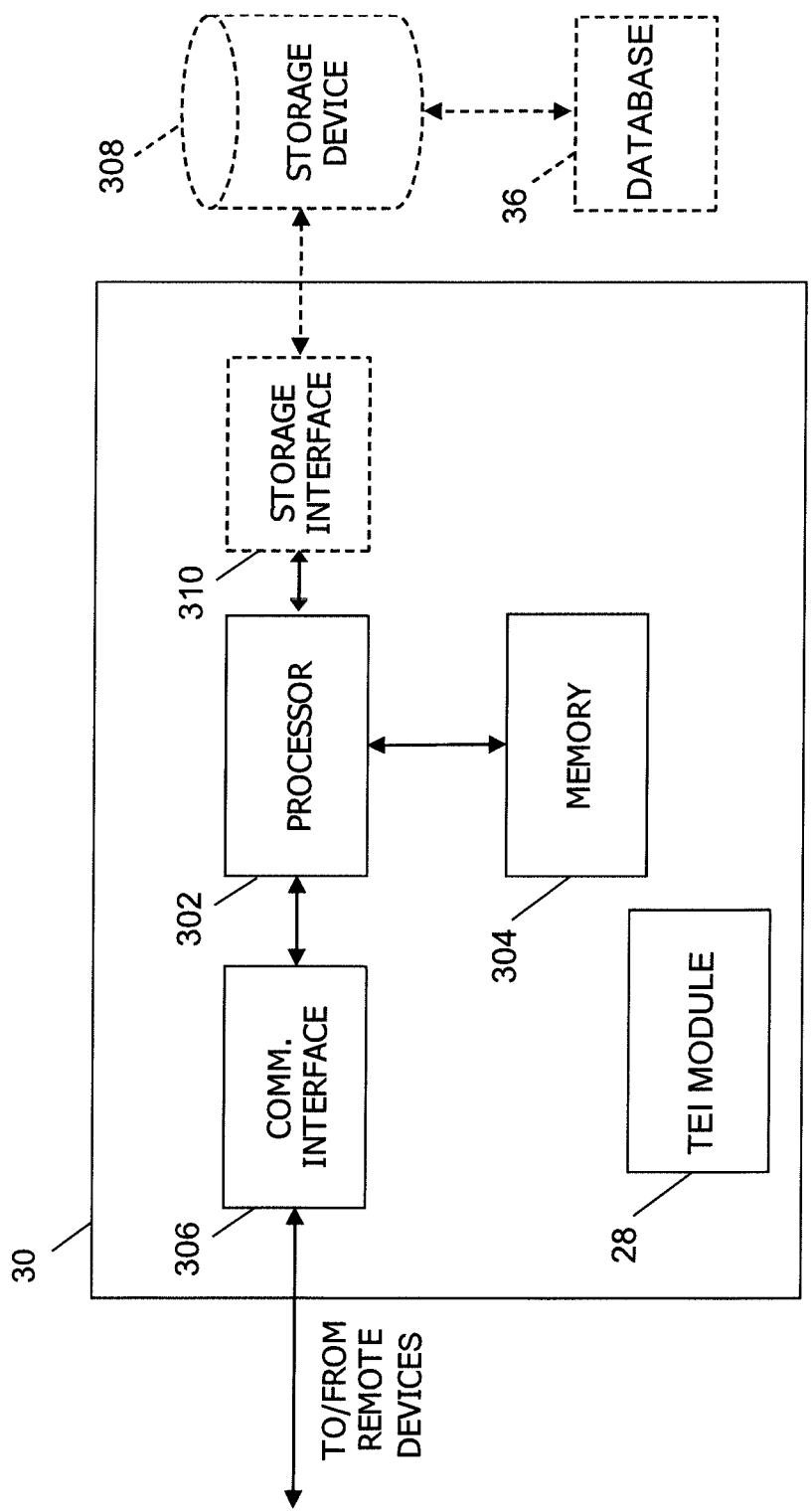
FIG. 3 illustrates an exemplary configuration of the server system shown in FIG. 2.

FIG. 3 illustrates an exemplary configuration of the server system 30 in more detail. In the exemplary embodiment, the server system 30 may include, for example, and without limitation, the server 36 and the TEI module 28. The server system 30 may additionally include one or more processors 302 for executing instructions, processes, code segments, routines, or the like, which may be stored in a memory 304. The processor 302 may include one or more processing units (e.g., in a multi-core configuration) for executing instructions. The instructions may be executed within a variety of different operating systems on the server system 30, such as UNIX, LINUX, Microsoft Windows®, etc. It should also be appreciated that upon initiation of a computer-implemented method, various instructions may be executed during initialization. Some operations may be required in order to perform one or more processes described herein, while other operations may be more general and/or specific to a particular programming language (e.g., C, C#, C++, Java, or other suitable programming languages, etc.).

The memory 304 of the server system 30 may be communicatively coupled with the processor 302 and may include, for example, and without limitation, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

The processor 302 may be operatively coupled to a communication interface 306 such that the server system 30 is capable of communicating with a remote device such as a client system 32 or another server system 30. For example, the communication interface 306 may communicate with the client systems 32 via the Internet. The processor 302 may also be operatively coupled to a storage device 308. The storage device 308 may comprise any computer-operated hardware suitable for storing and/or retrieving data. In certain embodiments, the storage device 308 may provide or make available the database 36, described above, which can be used by the sever system 30. In some embodiments, the storage device 308 may be integrated in the server system 30 and/or in the TEI module 28. For example, the server system 30 may include one or more hard disk drives that comprise the storage device 308. In other embodiments, the storage device 308 may be external to the server system 30 and may be accessed by the server systems 30 via a storage interface 310 described in more detail below. The storage device 308 may include multiple storage units such as hard disks or solid-state disks in a redundant array of inexpensive disks (RAID) configuration. The storage device 308 may include a storage area network (SAN) and/or a network attached storage (NAS) system.

As noted, the processor 302 may be operatively coupled to the storage device 308 via the storage interface 310. The storage interface 310 may comprise any component capable of providing the processor 302 with access to the storage device 308. The storage interface 310 may include, for example, and without limitation, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 302 with access to the storage device 308, Embodiments provide for the TEI module 28 to be a component of the server system 30 or, alternatively, to be a separate computing device. As such, the TEI module 28 can be used, as will be described in more detail below, to perform routines for analyzing transaction messages generated in response to initiated payment transactions. In embodiments in which the TEI module 28 is incorporated within the server system 30, the LEI module 28 may be a specifically-programmed section of the server system 30. As such, the TEI module 28 may use the processor 302, the memory 304, the communications interface 306, and/or the storage device 308 (including, e.g., the database 36) of the server system 30. In alternate embodiments, the TEI module 28 may be a separate computing device (which may be communicatively coupled with) the server system 30. In such embodiments, the TEI module 28 may include its own processor, memory, communications interface, and/or the storage device, similar to those components described above with respect to the server system 30. In such embodiments, for example, the TEI module 28 may be independently associated with the interchange network 16 or with an outside third party in a contractual relationship with the interchange network 16.

Returning to FIG. 2, the client systems 32 may include various computer systems associated with the merchant 12 and/or acquirer 14 (shown in FIG. 1), as well as the issuer 18 (also shown in FIG. 1). Another client system 32 may be a computing device associated with a cardholder 22. It should be understood, however, the client systems 32 may be computer systems associated with other entities, such as online banks, bill payment outsourcers, processors, billers, or another entity associated with the payment network system 10.

Figure 4:
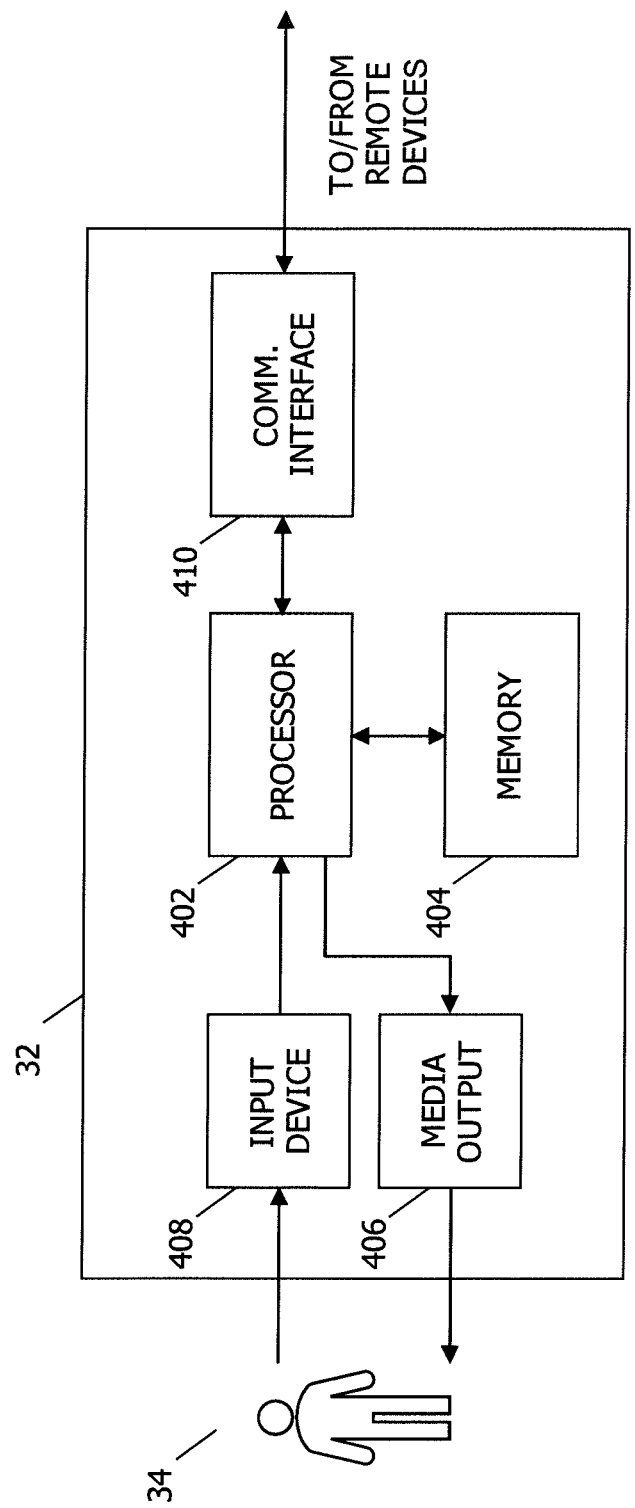
FIG. 4 illustrates an exemplary configuration of a client computing system from FIG. 2.

FIG. 4 illustrates an exemplary configuration of a client system 32. In the example embodiment, the client system 32 may include one or more processors 402 for executing instructions, processes, code segments, routines, or the like, which may be stored in a memory 404. The processor 402 may include one or more processing units, for example, a multi-core configuration. The memory 404 is any device allowing information such as executable instructions and/or other data to be stored and retrieved. The memory 404 may include one or more computer readable media.

The client system 32 may also include at least one media output component 406 for presenting information to users. The media output component 406 is any component capable of conveying information to an authorized user 34. In some embodiments, the media output component 406 includes an output adapter such as a video adapter and/or an audio adapter. An output adapter is operatively coupled to the processor 402 and operatively couplable to an output device such as a display device, a liquid crystal display (LCD), organic light emitting diode (OLED) display, or "electronic ink" display, or an audio output device, a speaker, or headphones.

In some embodiments, the client system 32 includes an input device 408 for receiving input from the user 34. The input device 408 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of the media output component 406 and the input device 408. The client system 32 may also include a communication interface 410, which is communicatively couplable to a remote device such as the server system 30. The communication interface 410 may include, for example, a wired or wireless network adapter or a wireless data transceiver for use with a mobile phone network, Global System for Mobile communications (GSM), 3G, 4G or Bluetooth or other mobile data network or Worldwide Interoperability for Microwave Access (WIMAX).

Stored in the memory area 404 are, for example, computer readable instructions for providing a user interface to the user 34 via the media output component 406 and, optionally, receiving and processing input from the input device 408. A user interface may include, among other possibilities, a web browser and a client application. Web browsers enable users, such as authorized user 34, to display and interact with media and other information typically embedded in remote applications, web pages, or websites.

The memory area 404 may include, for example, and without limitation, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Given the components of the payment network system 10 described above, embodiments of the present invention are configured to identify and resolve errors in transaction messages associated with payment transactions by analyzing financial transaction data included in the transaction messages. As previously noted, the use of third-party payment service providers (PSPs) by merchants 12 to originate and process payment transactions can lead to problems with payment network reporting, fraud monitoring, and the like. Specifically, in some instances, a given PSP will process payment transactions using transaction messages with a single merchant ID, even though the payment transactions may originate with several, distinct merchants. Such duplicative use of merchant IDs can cause problems with network reporting, fraud monitoring, data integrity, the monitoring of network-based programs, and the like. To address such problems, embodiments of the present invention, and particularly the TEI module 28, are specially configured to analyze transaction messages so as to identify errors, such as improper duplicative use of merchant IDs, in the transactions messages. Upon identifying such errors, embodiments of the present invention, and particularly the TEI module 28, can resolve such problems by reporting errors to the acquirers 14, such that the acquirers can correct the errors in future transactions messages so as to prevent or minimize errors in future payment transactions.

Figure 5:
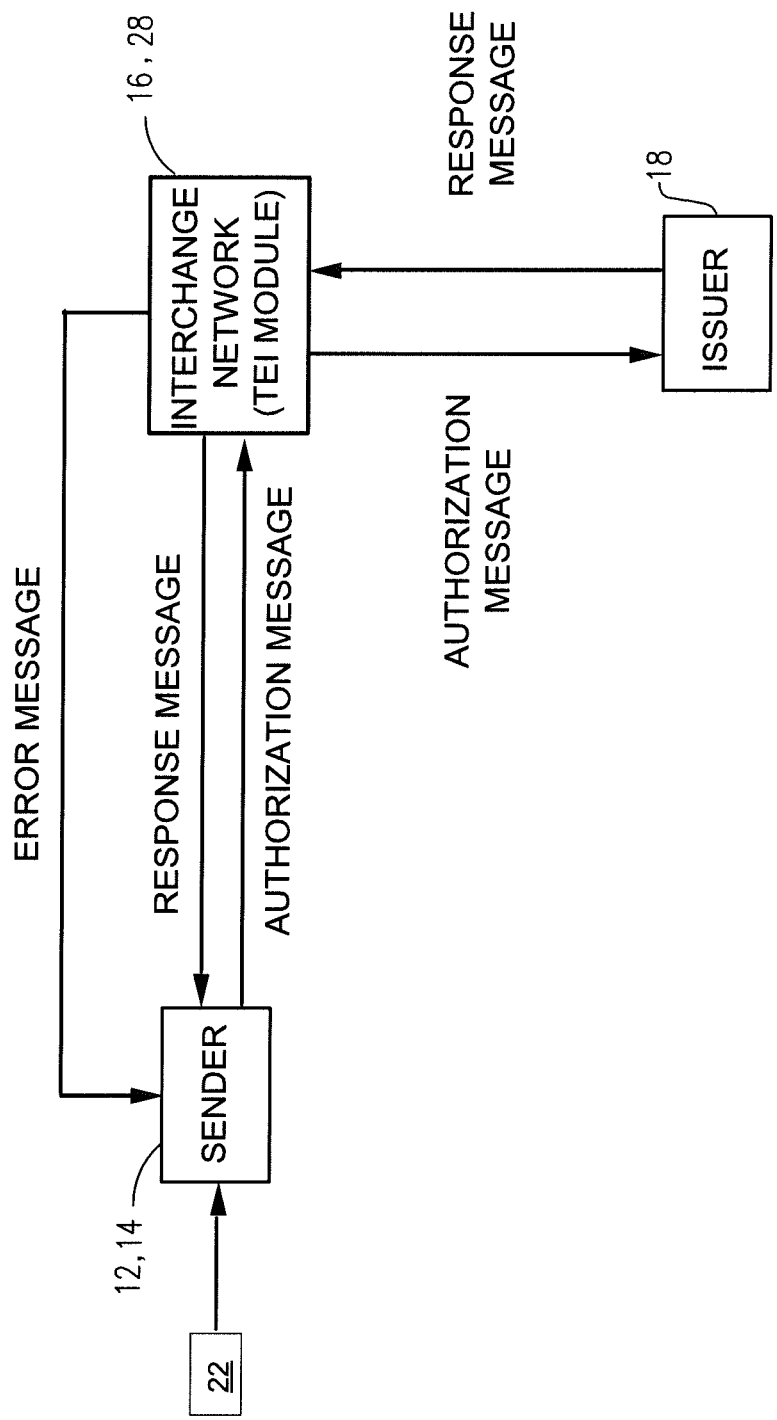
FIG. 5 is a data flow diagram illustrating transaction messages associated with payment transaction, whereby the transaction messages are being transmitted between a sender, an issuer, and an interchange network, and further illustrating a transaction error identification module (TEI module) of the interchange network configured to identify errors associated with the transaction messages.

FIG. 5 broadly illustrates a schematic diagram of the flow of transaction messages generated in response to an initiated payment transaction. As will be described in more detail below, the interchange network 16, and specifically the TEI module 28 of the interchange network 16, can analyze the transaction messages and, thereby, identify any errors included in the transaction messages. To begin, a sender, which may include the merchant 12 and/or the acquirer 14 can generate and send a transaction message (in the form of an authorization message) to the interchange network 16 in response to a cardholder 22 initiating a payment transaction at the merchant 12. Upon the authorization message being received at the interchange network 16, the TEI module 28 is configured to analyze the authorization message to determine whether one more data fields within the authorization message have been improperly populated with duplicate data elements.

As will be described in more detail below, certain data fields within a transaction messages are configured to be populated with data elements that (1) identify the merchant 12 at which the merchant's 12 payment transactions originate (i.e., a merchant identification (ID) or merchant ID data element), and/or (2) identify the acquirer 14 used by the merchant 12 to process the payment transactions (i.e., an acquirer identification (ID) or acquirer ID data element). As such, each transaction message will include a unique identifier combination (UIC) comprising the merchant ID and the acquirer ID, which can be used, to uniquely identify the merchant 12 at which the payment transaction originates and the merchant's 12 acquirer 14. Generally, payment transactions that originate via a particular payment processing system at a particular merchant 12 location should have a unique merchant ID and/or UIC. If, however, the TEI module 28 determines that certain transaction messages that originate from different merchant 12 locations are being improperly populated with duplicate merchant IDs and/or UICs, then the interchange network 16 (e.g., via the TEI module 28) may generate and send an error message to the appropriate acquirer 14 to notify the acquirer 14 of the problem so that the acquirer 14 can correct the errors in future transactions messages so as to prevent or minimize errors in future payment transactions. In some embodiments, the error message may be included within the batch settlement message that is periodically sent (e.g., daily) to the acquirer 14.

The above-described process, as broadly illustrated in FIG. 5, will now be described in more detail. As was previously noted, transaction messages are digital messages generated by entities within the payment network system 10 and used to convey financial transaction data representative of payment transactions. Transaction messages are generally formatted according to a standardized format. For example, many transaction messages are formatted according to the ISO 8583 format, which defines a plurality of standard fields for the data elements included within transaction messages. In a given transaction message, each of such fields may be populated with data elements associated with the associated payment transaction. These fields (and data elements populated therein) can be used by the various entities of the payment network system 10 to verify, authorize, settle, and/or report on the payment transactions with which the transaction messages are associated.

Commonly, transaction messages will comprise three primary types of fields: a message type indicator (MTI) field, a bitmap field, and data element fields. The MTI field of a transaction message is a field populated with a 4-digit MTI that is used to indicate the general functionality of the transaction message. For instance, MTIs may indicate (1) the overall purpose of the transaction message, (2) how the transaction message should flow within the payment network system 10, and (3) the source of the transaction message. As an example, an MTI having a value of "0100" indicates that the transaction message is a point-of-sale authorization request message (e.g., a "0100" authorization) originating from a merchant 12. In contrast, an MTI having a value of "0110" indicates that the transaction message is a response message (e.g., a "0110" response) originating from the issuer 18 in response to a "0100" authorization. Although the above examples include only authorization messages (e.g., "0100" authorizations) and response messages (e.g., "0110" responses), it should be understood that embodiments of the present invention may be used to analyze generally any type of transaction message.

The bitmap field of a transaction message is a field populated with a data value (generally a binary or hexadecimal value) that is indicative of those data elements that are populated in the data element fields of the transaction message (the data element fields are discussed further below). In more detail, transaction messages formatted according to ISO 8583 generally include (64), (128), or (192) data element fields that can each include data elements representative of various types of information related to an associated payment transaction. A bitmap data value for such a transaction message can be configured to indicate which of the data elements within the (64), (128), or (192) data element fields are populated with data. As such, the bitmap field of a transaction message can provide an indication as to which data element fields are populated with data elements, and which data element fields are unpopulated (i.e., blank).

Finally, the data elements fields of a transaction message include data elements relevant to the associated payment transaction. As indicated above with respect to the bitmap field, the transaction message may include (64), (128), or (192) data element fields, with each field configured to be populated with one or more data elements relevant to the associated payment transaction. In some instances, certain data element fields may include sub-fields, which can each be populated with data elements. The following are examples of data element fields and associated data elements for a transaction message. Data element field "2" of a transaction message may include a data element in the form of the primary account number (PAN), which may be the sixteen-digit number of the payment card (e.g., of the cardholder's 22 credit or debit card) used to initiate the payment transaction. Data element field "4" may include the monetary amount (e.g., in U.S. Dollars) of the payment transaction. Data element fields "12" and "13" may include the local time and date, respectively, of when the payment transaction was initiated.

In addition to the above general data fields, embodiments of the present invention, and particularly the TEI module 28 may analyze specific data element fields that are used to identify (1) the merchant 12 at which the payment transaction, and thus the transaction message, originates, and (2) the acquirer 14 associated with the merchant 12. In more detail, data element field "42" may include a data element in the form of the merchant ID data element (or, more generally, the merchant ID) that is indicative of the merchant 12 at which the payment transaction originated. In general, the merchant ID (as populated in data element "42") may be an alphanumeric and/or special character coded data element, which may be between zero and fifteen characters in length and which is commonly assigned by the merchant's 12 acquirer 14. Similarly, data element field "32" may include a data element in the form of the acquirer ID data element (or, more generally, the acquirer ID) that is indicative of the acquirer 14 of the merchant 12 at which the payment transaction originated. In general, the acquirer ID (as populated in data element "32") may be a numerical coded data element, which may be between zero and eleven characters in length and which is commonly assigned by the interchange network 16. Finally, data element field "43" may include a data element in the form of a merchant name and/or location data element (or, more generally, the merchant name/location) that is indicative of the name and/or location/address of the merchant 12 at which the payment transaction originated. In general, the merchant name/location (as populated in data element "43") may be an alphanumeric and/or special character coded data element, which may be between zero and forty characters in length and which is indicative of the name, the street address, the city, the state, and/or the country of the merchant 12. The merchant name/location is commonly assigned by the merchant's 12 acquirer 14.

In sum, as described in the examples above, data element fields of a transaction message are configured to hold information relevant to an associated payment transaction, with such information used to facilitate processing and settling of the payment transaction. For purposes of the TEI module 28, embodiments may analyze the data element fields associated with identifying the merchant 12 and the acquirer 14 (e.g., data element fields, "42," "32," and "43") to determine if any errors are present within the transaction messages. If errors are present, as determined by the TEI module 28, embodiments may provide for an error message to be sent to the responsible acquirer 14, such that the acquirer 14 can correct the error for future transactions messages so as to prohibit or minimize errors associated with future payment transactions.

The process of analyzing a transaction message to identify errors will now be described in more detail. For a transaction message in the form of an authorization message (e.g., a "0100" authorization), the data elements included within the data element fields are generally populated by the merchant 12 upon initiation of the associated payment transaction (e.g., upon the cardholder 22 swiping his/her card at the merchant's 12 point-of-sale (POS) terminal). In alternative instances, however, such as when the merchant 12 uses a PSP to process payment transactions, the data elements included within the data element fields will generally be populated by the PSP (e.g., upon the cardholder 22 swiping or otherwise providing his/her card at the PSPs point-of-sale (POS) terminal).

As noted previously, each merchant 12 is associated with a specific acquirer 14. Each acquirer 14 has its own, unique acquirer ID and assigns each of its merchants 12 a unique merchant ID. As such, transaction messages associated with payment transactions originating from a particular merchant 12 should all include the same merchant ID and acquirer ID. An example of such is illustrated below in Table A. Transactions "1" and "4" comprise payment transactions that originated at a point-of-sale (POS) terminal associated with Merchant A. As such, each of the resulting transaction messages from Transactions "1" and "4" include a merchant ID data element of "MA1" included in data element field 42. As further illustrated, Merchant A's acquirer 14 is Bank A, which has an acquirer ID of "1111," which would be included as the data element in data element field 32 of each of the resulting transaction messages. It should be understood, therefore, that all transaction messages that originate at the POS terminals of Merchant A (e.g., Transactions "1" and "4") will include a merchant ID of "MA1" and an acquirer ID of "1111." As previously described, the combination of the merchant ID and the acquirer ID is generally referred to herein as the unique identification combination (UIC), which for Transactions "1" and "4" is identified as "MA1-1111."

TABLE A

| Transaction | Payment Origination | Merchant ID | Acquirer Name | Acquirer ID | UIC |
| --- | --- | --- | --- | --- | --- |
| Transaction 1 | Merchant A - POS | MA1 | Bank A | 1111 | MA1-1111 |
| Transaction 2 | Merchant B - POS | MB1 | Bank B | 1112 | MB1-1112 |
| Transaction 3 | Merchant A - PSP(a) | PSP1 | Bank C | 1113 | PSP1-1113 |
| Transaction 4 | Merchant A - POS | MA1 | Bank A | 1111 | MA1-1111 |
| Transaction 5 | Merchant B - PSPA(a) | PSP1 | Bank C | 1113 | PSP1-1113 |

Remaining with Table A, Transaction "2" is a payment transaction that originated at a PUS terminal associated with Merchant B, which has been assigned by its acquirer 14 a merchant ID data element of "MB1." As such, the resulting transaction message associated with Transaction "2" would include a merchant ID of "MB1" included in data element field 42. In addition, Merchant B's acquirer is Bank B, which has an acquirer ID of "1112," which would be included as the data element in the data element field 32 of the resulting transaction message. It should be understood, therefore, that all transaction messages that originate at the PUS of Merchant B (including Transaction "2") will include a merchant ID of "MB1" and an acquirer ID of "1112." Thus, the UIC for Transaction "2" is "MB1-1112."

As should be apparent from Transactions "1," "2," and "4," each transaction message originating from a given payment processing system of a given merchant 12 should share the same unique merchant ID and/or UIC. For instance, all transaction messages originating from the PUS of Merchant A (e.g., Transactions "1" and "4") should have a UIC of "MA1-1111," whereas all transaction messages originating from the POS of Merchant B should have a UIC of "MB1-1112." Such consistency is important for network reporting, fraud monitoring, data integrity, the monitoring of network-based programs, and the like. However, as described above, it is common for merchants 12 to also use third-party payment service providers (PSPs) to originate payment transactions. As described below, the improper use of duplicate merchant IDs and/or UICs by PSPs can pose problems.

Referring again to Table A, in addition to an integral POS system, Merchant A may also use a third-party PSP (i.e., PSP(a)) to originate and initially process payment transactions. Transaction "3" is an example of a payment transaction originated by PSP(a) at the location of Merchant A. As shown, PSP(a) has been assigned a merchant ID of "PSP1" by its acquirer 14. As such, the resulting transaction message for Transaction "3" would include a merchant ID data element of "PSP1" included in data element field 42. It is noted that although the Transaction "3" originated at the physical location of Merchant A, the Merchant ID associated with the transaction message is "PSP1" because the third-party PSP(a) was responsible for originating and initially processing the payment transaction. As also illustrated in Table A, PSP(a)'s acquirer 14 is Bank C, which has an acquirer ID of "1113," which would be included as a data element in the data element field 32 of the resulting transaction message. Thus, the UIC for Transaction "3" is "PSP1-1113."

As noted previously, problems can arise if PSP(a) is used to originate and process payment transactions at other merchants 12 but fails to use a unique merchant ID and/or UIC at such other merchants 12. For instance, with reference to Table A, Merchant B may also use PSP(a) to originate and initially process payment transactions. For instance, Transaction "5" is an example of a payment transaction originated by PSP(a) at the location of Merchant B. While in use at Merchant B, however, PSP(a) uses the same merchant ID previously used with Merchant A, i.e., "PSP1" as assigned by Bank C. Because of PSP(a)'s use of a duplicate merchant ID, the resulting transaction message for Transaction "5" includes a merchant ID data element of "PSP1" included in data element field 42. It is again noted that although the Transaction "5" originated at the physical location of Merchant B, the merchant ID associated with the transaction message is "PSP1" because PSP(a) was responsible for originating and initially processing the payment transaction. As noted previously PSP(a)'s acquirer is Bank C, which has an acquirer ID of "1113," which would be included as the data element in the data element field 32 of the resulting transaction message. Thus, the UIC for Transaction "5" is "PSP1-1113."

The transactions show in Table A illustrate how potential problems can arise when duplicate merchant IDs and/or UICs are improperly used across multiple merchants 12 and/or merchant 12 locations. In general, a unique merchant ID should be used in transaction messages originating by a given merchant 12 at a given location. For instance, Merchant A and Merchant 13 each have a unique merchant ID (i.e., "MA1" and "MB1"), which are used for all payment transactions that originate from their respective POS systems at their respective locations. However, both Merchant A and Merchant B also use the third-party PSP(a) to originate and process certain payment transactions. According to requirements established by the network interchange 16, PSPs are assigned and should use a unique merchant ID at each location at which the PSPs originate and process payment transactions. For example, with respect to the payment transactions illustrated in Table A, PSP(a) should use a first unique merchant ID when originating and processing payment transactions at Merchant A, and should use a second unique merchant ID when originating and processing payment transactions at Merchant B. Such use of unique merchant IDs permits the interchange network 16 to properly perform required functions (e.g., network reporting, program monitoring, etc.). However, as shown in Table A, PSP(a) is using a duplicate merchant ID when originating and processing payment transactions at both Merchant A and at Merchant B, which can lead to problems related to network reporting, fraud monitoring, data integrity, the monitoring of network-based programs, and the like.

Embodiments of the present invention address such problems by identifying errors in transactions messages related to improper use of duplicate merchant IDs and/or UICs. Upon identifying such errors, embodiments can resolve such errors by reporting such improper use to acquirers to prevent and/or minimize future improper use. More particularly, the interchange network 16, including the TEI module 28 described above, may analyze the data fields within transaction messages to determine whether merchant IDs and/or UICs are being improperly duplicated. For instance, upon the initiation of a payment transaction by a cardholder 22 at a merchant 12, the merchant 12 will generate a transaction message in the form of an "0100" authorization and will send the "0100" authorization on to the interchange network 16 (e.g., via the acquirer 14). Upon receiving the "0100" authorization, the interchange network 16, and specifically the TEI module 28 of the interchange network 16, can analyze the data fields within the "0100" authorization to determine whether the transaction message is improperly using a duplicate merchant ID and/or UIC.

More specifically, the TEI module 28 may execute an error-identification routine to analyze whether the merchant ID being used in a transaction message is being used in error, e.g., such as improper duplicate usage. In further detail, upon the interchange network 16 receiving a transaction message, the TEI module 28 may analyze specific data fields within the transaction message by comparing the data elements within such specific data fields with historical financial transaction data stored in the database 36 associated with the server system 30 and/or the TEI module 28. In some embodiments, the database 36 may comprise a historical database that is configured to store historical financial transaction data related to previous payment transactions that have been processed by the interchange network 16. For example, the historical database may store all financial transaction data previously processed by the interchange network 16, including all of the data elements included in the transaction messages associated with the previously-processed payment transactions. In particular, the historical database may store, for each previously-processed payment transaction, (1) the merchant ID data element from data element field 42, (2) the acquirer ID data element from data element field 32, and (3) the merchant name/location data element from data element field 43. As noted previously, the combination of the merchant ID and the acquirer ID for each transaction message can be identified as the unique identification combination (UIC) for the transaction message and for the merchant 12 that originated and initially processed the associated payment transaction.

As such, embodiments provide for the TEI module 28 to compare the merchant ID and/or UIC of each transaction message processed by the interchange network 16 with the financial transaction data stored in the historical database. In particular, the TEI module 28 may compare the merchant ID and/or UIC of each currently-processed transaction message with all of the merchant IDs and/or UICs of prior transaction messages that are stored in the historical database. Upon finding a match between the merchant ID and/or UIC of a transaction message being processed with one or more merchant IDs and/or UICs stored in the historical database, the TEI module 28 may determine that the merchant ID and/or UIC of the transaction message being processed is being improperly used in a duplicate manner.

Upon finding a match of merchant IDs and/or UICs, the TEI module 28 may be configured to further compare additional merchant-related data to determine if the merchant ID and/or the UIC from the transaction message being processed is being properly used in a unique manner or is being improperly used in a duplicate manner. For instance, the TEI module 28 may compare the merchant name/location data element from data element field 43 of the transaction message being processed with merchant names/locations of those historical transaction messages that have merchant IDs and/or UICs that match the merchant ID and/or UIC of the transaction message being processed. If the merchant name/location of the payment transaction being processed is also found to match the merchant names/locations of the prior transaction messages in the historical database, then the merchant ID and/or UIC of the transaction message being processed is determined to have been properly used in a unique manner, such that no further action is necessary (although the data included in the transaction message being processed may be stored in the historical database for future analysis).

In contrast, if the merchant name/location of the transaction message being processed is found not to match the merchant names/locations of the prior transaction messages from the historical database, then the merchant ID and/or UIC of the transaction message being processed is determined not to have been used in an appropriately unique manner, and the transaction message being processed is flagged or otherwise identified as having an error (i.e., improper duplicative use of a merchant ID and/or UIC). In addition to comparing merchant names/locations, embodiments may perform comparisons of other financial transaction data of transaction messages to determine if merchant IDs and/or UICs are being improperly duplicated. For instance, embodiments may compare other data elements, or combinations of data elements, of transaction messages that may give an indication that a merchant ID is being improperly duplicated by a merchant 12 or PSP across multiple merchant 12 locations.

In cases where an error is identified, the flagged transaction message, or portions thereof, may be stored in an audit database, which may be part of the database 36 associated with the TEI module 28. In some embodiments, at least the UIC (i.e., the merchant ID and the acquirer ID) and the merchant name/location from the flagged transaction message will be stored in the audit database. Periodically, the TEI module 28 will notify the responsible acquirers 14 of each of the improper uses of duplicate merchant IDs or UICs. For instance, once per day, the TEI 28 may compile each UIC and associated merchant name/location that was flagged as an improper duplicate and will send the same to the responsible acquirer 14 in the form of an error message or report. In some embodiments, the error message may be compiled in the daily settlement batch message that is sent to the acquirers 14 for purposes of settling and reporting on the day's payment transactions processed by the interchange network 16.

To identify the responsible acquirer 14, the TEI module 28 may compare the flagged acquirer ID with acquirer IDs stored in an acquiring database, with such acquiring database being formed, in some embodiments, as part of the database 36. The acquiring database may store, for each acquirer ID, information indicative of the actual acquirer 14 represented by the acquirer ID. As such, the TEI module 28 can obtain the identities of the acquirers 14 to which the error messages should be sent.

Upon the TEI module 28 transmitting the error message, which may include the flagged merchant IDs and/or UICs and associated merchant name/location to the responsible acquirers 14, e.g., over the communications network 20, the responsible acquirers 14 are then required to correct the problem of their merchants 14 and/or PSPs improperly using duplicate merchant IDs and/or UICs. As noted, the merchant ID and/or UIC used by a given merchant 12 (or a PSP) at a given location should be unique. Thus, if a merchant ID and/or UIC is being duplicated across multiple merchants 14 and/or multiple merchant 12 locations, such duplication can lead to problems related to network reporting, fraud monitoring, data integrity, the monitoring of network-based programs, and the like. To address such problems, upon responsible acquirers 14 receiving error messages, which indicate improper duplication, the acquirers 14 should assign or re-assign merchant IDs, where appropriate, to ensure that future duplications of unique merchant IDs and/or UICs do not occur. In some embodiments, the interchange network 16 may impose a monetary fine or other penalty upon responsible acquirers 14 to ensure that acquirers 12 require that their merchants 12 and/or PSPs do not continue to improperly use duplicate merchant IDs and/or UICs.

Table A, as shown above, is illustrative as to how embodiments of the present invention can be used to identify and resolve errors in transaction messages, such as improper duplicate usage of a merchant IDs and/or UICs. Upon the interchange network 16 receiving the transaction messages associated with Transactions "1"-"3", the financial transaction data associated with the transaction messages will be stored in the historical database. It is assumed herein that transaction messages for Transactions "1"-"3" did not include any duplicate merchant IDs and/or UICs. Upon receiving the transaction message of Transaction "4," the TEI module 28 will compare the merchant ID data element and/or UIC of the Transaction "4" transaction message with the merchant IDs and/or UICs stored in the historical database to determine if a match is found. Such a comparison will find that the merchant ID and/or UIC of Transaction "4" matches with the UIC of Transaction "1." Upon finding such a match of merchant IDs and/or UICs, the TEI module 28 will further compare the merchant names/locations for each of Transactions "1" and "4" to determine if the UICs are properly unique. Such a comparison will reveal that the merchant name/location of both Transactions "1" and "4" are the same (i.e., Merchant A-POS), such that the UICs of each of Transactions "1" and "4" are being used in a consistent and properly unique manner. Such consistency is appropriate (and, thus, not in error) because Transactions "1" and "4" both originate via the integral POS systems of Merchant A.

Upon receiving the transaction messages of Transaction "5," the TEI module 28 will compare the merchant ID data element and/or UIC of the Transaction "5" transaction message with the merchant IDs and/or UICs stored in the historical database to determine if a match is found. A comparison will find that the merchant ID and/or UIC of Transaction "5" matches with the merchant ID and/or UIC of Transaction "3." Upon finding such a match, the TEI module 28 will further compare the merchant names/locations for each of Transactions "3" and "5" to determine if the UICs are properly unique. Such a comparison will reveal that the merchant name/location for each of Transactions "3" and "5" are not the same (i.e., Merchant A-PSP(a) versus Merchant B-PSP(a)), which indicates that that the merchant IDs and/or UICs of Transactions "3" and "5" are being improperly duplicated and, thus, in error.

Upon identifying the error in the transaction message of Transaction "5," the TEI module 28 will store the UIC and the merchant name/location from the transaction message of Transaction "5" in the audit database. At a selected time (e.g., at the time the daily settlement batch message is sent to the acquirer 14), the TEI module 28 will generate and send an error message, which may be included within the settlement batch message, to PSP(a)'s acquirer 14, which is Bank C. The error message may include the listing of the merchant ID and/or UIC, as well as the merchant name/location, that is being improperly used in a duplicate manner by PSP(a). As such, Bank C will be required to resolve such error by ensuring that, in the future, PSP(a) uses a unique merchant ID and/or UIC for payment transactions originating at each individual merchant 12 and/or merchant 12 location.

Figure 6:
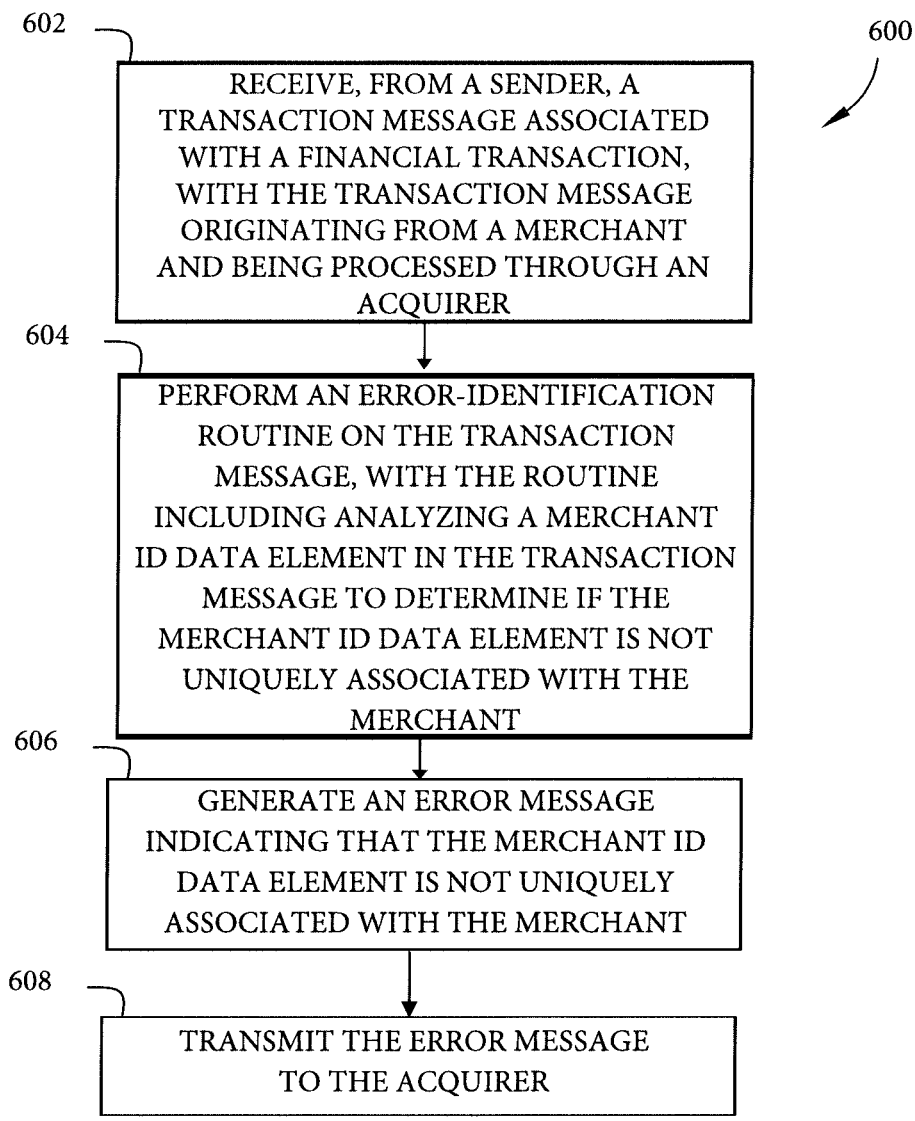
FIG. 6 is a flow chart of an exemplary method for identifying errors associated with transaction messages according to embodiments of the present invention.

FIG. 6 shows a flow chart of an exemplary method 600 for identifying errors in transaction messages generated in response to a financial transaction (e.g., a payment transaction) initiated by a cardholder 22. In the example embodiment, the method 600 may be implemented by the TEI module 28, which was described above.

In the exemplary embodiment, the method 600, as illustrated in FIG. 6 includes Step 602 comprised of receiving, from a sender (e.g., the merchant 12), a transaction message (e.g., a "0100" authorization) associated with a financial transaction, such as a payment transaction discussed above. Such financial transaction originates from a merchant 12 and is processed by an acquirer 14. The transaction message comprises a plurality of data element fields, with at least one of the data element fields being a merchant identification field (e.g., merchant ID field "42") used to identify the merchant originating the financial transaction. A Step 604 includes performing an error-identification routine on the transaction message (e.g., via the TEI module 28), with the error-identification routine including analyzing a merchant identification (ID) data element populated in the merchant identification field to determine if the merchant ID data element is not uniquely associated with the merchant 12. An additional Step 606 includes generating an error message indicating that the merchant ID data element is not uniquely associated with the merchant 12. A further Step 608 includes transmitting the error message to the acquirer 14.

Given the embodiments of the present invention discussed above, the interchange network 16 can ensure the consistency and accuracy of various required services and/or products, such as network reporting, fraud monitoring, data integrity, the monitoring of network-based programs, and the like. For example, with respect to an excessive chargeback program, embodiments allow the interchange network 16 to identify errors in transaction messages associated with payment transactions so that the interchange network 16 can accurately monitor those payment transactions that should apply to a specific merchant 12. As was noted previously, for excessive chargeback programs, the interchange network 16 is required to monitor all of a merchant's 12 payment transactions to ensure that those transactions stay within a normal chargeback to sales ratio. If a particular merchant 12 is also a using a PSP to originate payment transactions, and if the PSP is improperly duplicating merchant ID and/or a UIC across multiple merchants, then network monitoring and reporting of the particular merchant 12 will he affected. Specifically, the interchange network 16 will be unable to accurately determine the actual chargeback to sales ratio of the particular merchant 12 because of the PSPs improper use of a duplicate merchant ID and/or UIC. Embodiments of the present invention, including the computer-implemented method 600 discussed above, address such problems by identifying errors in transaction messages (e.g., the improper use of duplicate merchant IDs and/or UICs) and resolving such errors by generating and transmitting error reports to the responsible acquirer 14.

It is noted that the computer-implemented method 600 may include more, fewer, or alternative operations, including those discussed elsewhere herein. Furthermore, any steps, actions, functions, operations, and the like recited herein may be performed in the order shown in the figures and/or described above, or may be performed in a different order. Furthermore, some operations may be performed concurrently as opposed to sequentially. Although the computer-implemented method is described above, for the purpose of illustration, as being executed by an example system and/or example physical elements, it will be understood that the performance of any one or more of such actions may be differently distributed without departing from the spirit of the present invention.

A computer-readable storage media or medium comprising a non-transitory medium may include an executable computer program stored thereon. The computer program preferably instructs one or more processing elements to perform some or all of the operations described herein, including some or all of the operations of the computer-implemented method. The computer program stored on the computer-readable medium may instruct the processor and/or other components of the system to perform additional, fewer, or alternative operations, including those discussed elsewhere herein.

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

The terms "processor," "processing element," and the like, as used herein, may, unless otherwise stated, broadly refer to any programmable system including systems using central processing units, microprocessors, microcontrollers, reduced instruction set circuits (RISC), application specific integrated circuits (ASIC), logic circuits, and any other circuit or processor capable of executing the functions described herein. The above examples are illustrative only, and are thus not intended to limit in any way the definition and/or meaning of the term "processor." In particular, a "processor" may include one or more processors individually or collectively performing the described operations. In addition, the terms "software," "computer program," and the like, may, unless otherwise stated, broadly refer to any executable code stored in memory for execution on mobile devices, clusters, personal computers, workstations, clients, servers, and a processor or wherein the memory includes read-only memory (ROM), electronic programmable read-only memory (EPROM), random access memory (RAM), erasable electronic programmable read-only memory (EEPROM), and non-volatile RAM (NVRAM) memory. The above described memory types are examples only, and are thus not limiting as to the types of memory usable for storage of a computer program.

The terms "computer," "computing device," "computer system," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "network," "communications network," and the like, as used herein, may, unless otherwise stated, broadly refer to substantially any suitable technology for facilitating communications (e.g., GSM, CDMA, TDMA, WCDMA, LTE, EDGE, OFDM, GPRS, EV-DO, UWB, WiFi, IEEE 802 including Ethernet, WiMAX, and/or others), including supporting various local area networks (LANs), personal area networks (PAN), or short-range communications protocols.

The term "communication component," "communication interface," and the like, as used herein, may, unless otherwise stated, broadly refer to substantially any suitable technology for facilitating communications, and may include one or more transceivers (e.g., WWAN, WLAN, and/or WPAN transceivers) functioning in accordance with IEEE standards, 3GPP standards, or other standards, and configured to receive and transmit signals via a communications network.

The term "memory" "memory area," "storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Although the invention has been described with reference to the one or more embodiments illustrated in the figures, it is understood that equivalents may be employed and substitutions made herein without departing from the scope of the invention as recited in the claims.

What is claimed is:

1. A system for identifying errors in transaction messages processed through a payment network, said system comprising:
    a transaction error identification (TEI) computing device;
    a memory device storing historical transaction data and a plurality of acquirer identifiers (IDs), each respective acquirer ID being associated with information indicative of the acquirer represented by the respective acquirer ID; and
    a processor communicatively coupled to said memory device and said TEI computing device, said processor programmed to:
        receive, from a sender, a transaction message associated with a financial transaction, the financial transaction originating from a merchant and processed through an acquirer,
        the transaction message including a plurality of data element fields, at least one of the data element fields is a merchant identification field including a merchant identification (ID) data element used to identify the merchant at which the financial transaction originated and at least another one of the data element fields is an acquirer identification field including an acquirer identification (ID) data element;
        process the merchant ID data element at the TEI computing device by executing an error-identification routine to analyze the merchant ID data element populated in the merchant identification field;
        compare, by the TEI computing device, the merchant ID data element to the historical transaction data;
        based on the comparison, determine, by the TEI computing device, that the merchant ID data element is not uniquely associated with the merchant, wherein the merchant ID is duplicated with one or more second merchants;
        flag the transaction message, wherein the flag indicates that the transaction messages include an error;
        store the flagged transaction message in the memory device;
        generate an error message indicating that the merchant ID data element is not uniquely associated with the merchant;
        process the acquirer ID data element at the TEI computing device to identify the acquirer associated with the flagged transaction message by matching the acquirer ID of the transaction message to one of the plurality of acquirer IDs stored on the memory device; and
        transmit the error message to the acquirer.

2. The system in accordance with claim 1,
    said processor programmed to process the acquirer ID data element at the TEI computing device using the error-identification routine to analyze the acquirer ID data element.

3. The system in accordance with claim 2, wherein a combination of the merchant ID data element and the acquirer ID data element comprises a unique identifier combination (UIC).

4. The system in accordance with claim 3, at least one of the data element fields is a merchant name/location field including a merchant name data element,
    said processor programmed to process the merchant name data element at the TEI computing device using the error-identification routine to analyze the merchant name data element.

5. The system in accordance with claim 4,
said memory device including a database for storing UICs and merchant names associated with prior financial transactions, and wherein the processor is further programmed to:
compare the UIC of the transaction message with the UICs of the prior transaction messages stored in the database;
upon the UIC of the transaction message being found to match any of the UICs of the prior transaction messages, compare the merchant name of the transaction message with the merchant names of the prior transaction messages with UIC's that match the UIC of the transaction message; and
wherein upon the merchant name of the transaction message being found to not match the merchant names of the prior transaction messages with UIC's that match the UIC of the transaction message, the error message is generated.

6. The system in accordance with claim 1, wherein the error message is included in a settlement batch message transmitted to the acquirer.

7. The system in accordance with claim 1, wherein the transaction message is an authorization message associated with financial transaction.

8. The system in accordance with claim 7, wherein the transaction message is formatted according to an ISO 8583 format.

9. The system in accordance with claim 8, wherein the merchant identification field is data element field 42 in the transaction message.

10. The system in accordance with claim 3, wherein the acquirer identification field is data element field 32 in the transaction message, and wherein the merchant name/location field is data element field 43 in the transaction message.

11. A computer-implemented method for identifying errors in transaction messages processed through a payment network, said method comprising the steps of:
receiving, from a sender, a transaction message associated with a financial transaction, the financial transaction originating from a merchant and processed through an acquirer,
the transaction message including a plurality of data element fields, at least one of the data element fields is a merchant identification field including a merchant identification (ID) data element used to identify the merchant at which the financial transaction originated and at least another one of the data element fields is an acquirer identification field including an acquirer identification (ID) data element;
processing the merchant ID data element at a transaction error identification (TEI) computing device, including executing an error-identification routine to analyze the merchant ID data element populated in the merchant identification field;
comparing, by the TEI computing device, the merchant ID data element to historical transaction data stored in a historical database, the historical database further including a plurality of acquirer identifiers (IDs) stored thereon, each respective acquirer ID being associated with information indicative of the acquirer represented by the respective acquirer ID;
based on the comparison, determining, by the TEI computing device, that the merchant ID data element is not uniquely associated with the merchant, wherein the merchant ID is duplicated with one or more second merchants;
flagging the transaction message, wherein the flagging indicates that the transaction messages include an error;
storing the flagged transaction message in an audit database;
generating an error message indicating that the merchant ID data element is not uniquely associate with the merchant;
processing the acquirer ID data element at the TEI computing device to identify the acquirer associated with the flagged transaction message by matching the acquirer ID of the transaction message to one of the plurality of acquirer IDs stored on the historical database; and
transmitting the error message to the acquirer.

12. The computer-implemented method in accordance with claim 11,
said computer-implemented method further comprising processing the acquirer ID data element at the TEI computing device using the error-identification routine to analyze the acquirer ID data element.

13. The computer-implemented method in accordance with claim 12, wherein a combination of the merchant ID data element and the acquirer ID data element comprises a unique identifier combination (UIC).

14. The computer-implemented method in accordance with claim 13, further comprising the steps of:
comparing the UIC of the transaction message with UICs of prior transaction messages; and
upon the UIC of the transaction message being found to match any of the UICs of the prior transaction messages, the error message is generated.

15. The computer-implemented method in accordance with claim 11, wherein the error message is included in a settlement batch message transmitted to the acquirer.

16. One or more non-transitory computer-readable storage media having computer-executable instructions for identifying errors in transaction messages processed through a payment network, wherein when executed by at least one processor the computer-executable instructions cause the processor to:
receive, from a sender, a transaction message associated with a financial transaction, the financial transaction originating from a merchant and processed through an acquirer,
the transaction message including a plurality of data element fields, at least one of the data element fields is a merchant identification field including a merchant identification (ID) data element used to identify the merchant at which the financial transaction originated and at least another one of the data element fields is an acquirer identification field including an acquirer identification (ID) data element;
process the merchant ID data element at the TEI computing device by executing an error-identification routine to analyze the merchant ID data element populated in the merchant identification field;
compare, by the TEI computing device, the merchant ID data element to historical transaction data stored in a historical database, the historical database further including a plurality of acquirer identifiers (IDs) stored thereon, each respective acquirer ID being associated with information indicative of the acquirer represented by the respective acquirer ID;
based on the comparison, determine, by the TEI computing device, that the merchant ID data element is not uniquely associated with the merchant, wherein the merchant ID is duplicated with one or more second merchants;

flag the transaction message, wherein the flag indicates that the transaction messages include an error;

store the flagged transaction message in an audit database;

generate an error message indicating that the merchant ID data element is not uniquely associate with the merchant;

process the acquirer ID data element at the TEI computing device to identify the acquirer associated with the flagged transaction message by matching the acquirer ID of the transaction message to one of the plurality of acquirer IDs stored on the historical database; and transmit the error message to the acquirer.

17. The non-transitory computer-readable storage media in accordance with claim 16, the computer-executable instructions causing the processor to process the acquirer ID data element at the TEI computing device using the error-identification routine to analyze the acquirer ID data element.

18. The non-transitory computer-readable storage media in accordance with claim 17, wherein a combination of the merchant ID data element and the acquirer ID data element comprises a unique identifier combination (UIC).

19. The non-transitory computer-readable storage media in accordance with claim 18, wherein the computer-executable instructions further cause the processor to:

compare the UIC of the transaction message with UICs of prior transaction messages; and upon the UIC of the transaction message being found to match any of the UICs of the prior transaction messages, the error message is generated.

20. The non-transitory computer-readable storage media in accordance with claim 16, wherein the error message is included in a settlement batch message transmitted to the acquirer.

* * * * *